March 24, 1953 R. H. SUESKIND 2,632,708
CUPS FOR FROZEN POPS
Filed Sept. 7, 1951
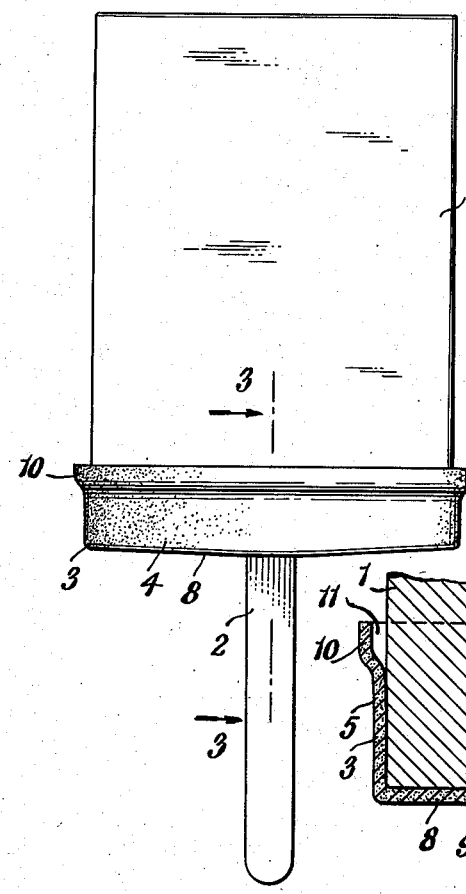
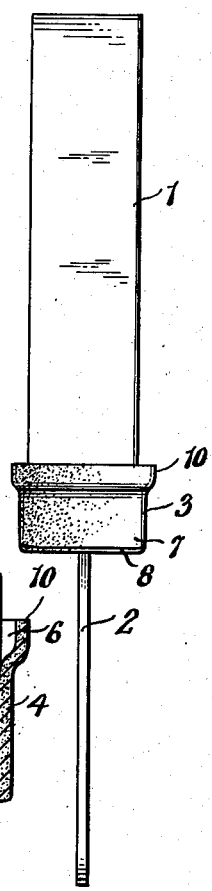
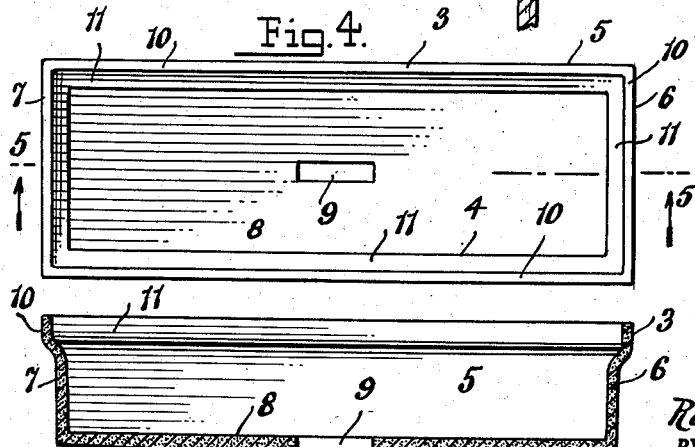
INVENTOR.
Ralph H. Sueskind
BY Harry Radzinsky
Attorney Patented Mar. 24, 1953

2,632,708

UNITED STATES PATENT OFFICE 2,632,708

CUPS FOR FROZEN POPS

Ralph H. Sueskind, Forest Hills, N. Y.

Application September 7, 1951, Serial No. 245,439

4 Claims. (Cl. 99—137)

This invention relates to cups or holders for ice cream or other frozen pops and has for its primary object the provision of a device, intended for fitment upon a frozen pop which will catch the drippings therefrom, and which will be edible with the pop.

A frozen pop, as known in the trade, consists of a block of ice cream, ice or frozen sherbet, having a projecting stick or handle that is held in the hand while the pop is being eaten. While the pop is being consumed, it exhibits a tendency to melt and drip, the drippings often damaging the clothing of the eater. Efforts have been made in the past to provide protection from the drippings by means of a paper napkin having a slit through which the stick of the pop is inserted, or by means of a paper plate similarly apertured to receive the stick. These arrangements, while tending to catch the drippings from the pop, were impediments to the eating of the pop, were difficult to remove and prevented the pop from being conveniently completely consumed.

It is, therefore, an object of the invention to provide a cup composed of edible material which is snugly fitted upon the lower end of a pop; which frictionally holds its position on the pop and on the stick extending therefrom; which will effectively catch the drippings from the pop and which will permit the complete consumption of the pop and the cup and its contents as well.

More particularly, the invention contemplates the provision of a cup-shaped member of pastry material, or other suitable edible material provided with a central slit or aperture in its bottom wall through which the stick of the pop is inserted and which will closely fit about the stick; the side walls of the cup closely and snugly fitting the end portion or base portion of the pop and preferably being at least slightly flared at the top to form a gutter at the top to effectively catch the drippings from the pop.

The above objects and other objects to be hereinafter set forth are attained by the invention, a more particular description of which will hereinafter appear and be set forth in the claims appended hereto.

In the accompanying drawing, wherein an illustrative embodiment of the invention is disclosed, Fig. 1 is a face view of a frozen pop to which the improved cup is attached;

Fig. 2 is a side elevational view of the same;

Fig. 3 is an enlarged sectional view taken substantially on the line 3—3 of Fig. 1, looking in the direction of the arrows;

Fig. 4 is an enlarged top plan view of the cup;

Fig. 5 is a sectional view taken on the line 5—5 of Fig. 4, looking in the direction of the arrows; and Fig. 6 is a transverse sectional view of a slightly modified type of cup.

In the drawings is illustrated a cup 3 adapted for use in connection with the substantially rectangular type of pop indicated at 1. This pop can be composed of ice cream, frozen sherbet, or of other frozen edible materials, and is provided with the conventional projecting stick or handle 2, generally composed of wood and sometimes made of other materials, by means of which the pop is held in the hand while being eaten.

For a pop of the shape disclosed, the cup 3 is made in the form of a shallow, rectangular trough, provided with the side walls 4 and 5 connected at the ends by the end walls 6 and 7. The bottom is shown at 8. The cup is preferably formed of edible material, such as the pastry or cracker material of the character of ice cream cones are made, so that when the pop is eaten the cup can be consumed along with the body of the pop.

Provided at a central point in the bottom of the cup 3 is a slot or aperture 9 through which the stick 2 is thrust and from which the stick protrudes to form the conventional handle for holding the pop while it is being eaten. The cup is preferably otherwise made inperforate. The bottom 8 of the cup may be of tapering thickness, with its thicker portion located adjacent to the slot or aperture 9, as clearly seen in Fig. 5, so that reinforcement adjacent to this aperture is provided to an extent that the bottom wall of the cup is not likely to be shattered or broken around the aperture by the act of thrusting the stick through it. Such reinforcement may be found unnecessary, since the need for the same is largely dependent upon the nature of the pastry or cracker material from which the cup is formed. If greater reinforcement around the slot 9 is found desirable, a boss such as indicated at 12 in dotted lines in Fig. 5, may be provided around the slot.

At its top, the cup is provided with flared parts 10 on the side and end walls, these parts forming extended flanges which result in the formation of a gutter 11 extending continuously around the top of the cup and serving to catch and hold melted parts or drippings from the pop while it is being eaten.

In the application of the cup to the pop, several courses may be followed. That is to say, the cup can be fitted on the pop by the ice cream manufacturer, with the pop and the attached cup then placed in a single protective bag or wrapper. As an alternative, the cup can be fitted on the pop at the time the pop is purchased by the consumer. The flared mouth of the cup forming the gutter, also aids in fitting the cup in place on the bottom end of the body of the pop. The lower portions of the side and end walls of the cup 3 are arranged to fairly snugly engage the lower or base portion of the pop and the frictional engagement of these walls with the base portion of the pop, together with the frictional engagement of the slot 9 with the stick, will tend to hold the cup securely in place on the bottom or base of the pop and prevent the same from sliding down on the stick while the pop is being eaten. Any drippings from the pop will be caught and retained by the gutter 11.

Since the cup is composed of pastry or other edible material, the problem of removing it or stripping it from the bottom of the pop to permit the complete consumption of the pop is not present, for the cup and its contents are eaten along with the base portion of the pop, leaving nothing but the stick remaining. The cup is so shaped that it may be readily nested with others for packing or shipping. When once placed in position upon the bottom or base portion of the pop, it need not be thereafter handled or touched by the eater, as distinguished from the conventional ice cream cone which is constantly held in the hand while being eaten.

In Figs. 1 to 5 of the drawing, the walls of the cup are shown as being provided with an outwardly curved or flared upper end. A variation of this is shown in the cup 13 disclosed in Fig. 6, wherein the upper portions of the walls of the cup are angularly flared as indicated at 14. Other variations, resulting in means by which drippings from the pop will be retained, are possible.

While I have herein shown and described the cup as being made in certain specific shapes, it will be understood that these shapes may be varied, since the shape of the cup is primarily dependent upon the shape of the pop on which it is intended to fit. Hence, I do not wish to be limited to the specific shape shown, since it is obvious that the same may be varied in many ways to meet shapes, sizes and pops now on or likely to be placed on the market.

What I claim is:

1. For use with a preformed frozen pop of the order of ice cream, ice and frozen sherbet, and wherein a stick is embedded in the pop during the freezing formation thereof with the stick projecting a considerable distance at one end from the pop to constitute a handle, an edible cup proportioned to fit one end of the frozen pop with the major portion of the pop projecting outwardly of the cup, said cup having side and end walls inclosing one end of the pop and a bottom wall with a central opening therein for the passage of the end of the handle projecting from the pop.

2. An article as in claim 1, wherein the major portions of the side and end walls of the cup contact the frozen pop and the upper edges of the side and end walls flaring outwardly and then upwardly to form a drip collection gutter extending entirely around and spaced from the frozen pop.

3. An article as in claim 1, wherein the frozen pop and edible cup are configurated to form an interlocking connection between the pop and cup when assembled.

4. An article as in claim 1, wherein the major portions of the side and end walls of the cup contact the frozen pop, the upper edges of the side and end walls flaring outwardly and then upwardly to form a drip collection gutter extending entirely around and spaced from the frozen pop, the frozen pop and edible cup being configurated to form an interlocking connection between the pop and cup when assembled.

RALPH H. SUESKIND.

REFERENCES CITED

The following references are of record in the file of this patent:

UNITED STATES PATENTS

| Number | Name | Date |
| --- | --- | --- |
| 1,652,789 | Moore | Dec. 13, 1927 |
| 1,761,703 | Brimer | June 3, 1930 |
| 1,835,719 | Parr | Dec. 8, 1931 |
| 1,939,450 | Horton | Dec. 12, 1933 |
| 2,087,068 | Pape | July 13, 1937 |